United States Patent
Gibson et al.

(10) Patent No.: US 9,278,685 B2
(45) Date of Patent: Mar. 8, 2016

(54) METHOD AND SYSTEM FOR ADAPTING OPERATION OF A HYBRID VEHICLE TRANSMISSION TORQUE CONVERTER LOCKUP CLUTCH

(71) Applicant: Ford Global Technologies, LLC, Dearborn, MI (US)

(72) Inventors: Alex O'Connor Gibson, Ann Arbor, MI (US); Jeffrey Allen Doering, Canton, MI (US); Adam Nathan Banker, Plymouth, MI (US); David Oshinsky, Trenton, MI (US); Dennis Craig Reed, Dexter, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 81 days.

(21) Appl. No.: 13/710,216

(22) Filed: Dec. 10, 2012

(65) Prior Publication Data
US 2014/0163787 A1 Jun. 12, 2014

(51) Int. Cl.
| | | |
|---|---|---|
| B60W 20/00 | (2006.01) | |
| B60W 10/02 | (2006.01) | |
| B60W 10/08 | (2006.01) | |
| B60W 30/18 | (2012.01) | |
| B60K 6/48 | (2007.10) | |

(52) U.S. Cl.
CPC .......... B60W 20/40 (2013.01); B60W 10/026 (2013.01); B60W 10/08 (2013.01); B60W 30/181 (2013.01); B60K 2006/4825 (2013.01); B60W 2510/083 (2013.01); B60W 2710/023 (2013.01); B60W 2710/081 (2013.01); B60W 2710/1022 (2013.01); Y02T 10/6252 (2013.01); Y10T 477/26 (2015.01)

(58) Field of Classification Search
CPC ... B60W 10/026; B60W 20/00; B60W 10/08; B60W 20/40; B60W 30/181; B60K 6/48; B60K 2006/4825; B60K 2510/083; B60K 2710/023; B60K 2710/081; B60K 2710/1022; Y02T 10/6221; Y02T 10/6252; Y10T 477/26
USPC .......................................................... 701/22
See application file for complete search history.

(56) References Cited

U.S. PATENT DOCUMENTS

| | | | |
|---|---|---|---|
| 6,183,389 B1 * | 2/2001 | Tabata | 477/5 |
| 6,802,796 B2 | 10/2004 | Asa et al. | |
| 7,055,635 B2 * | 6/2006 | Itoh et al. | 180/65.25 |
| 7,100,720 B2 * | 9/2006 | Ishikawa | 180/65.26 |
| 7,360,616 B2 * | 4/2008 | Schiele | 180/65.265 |
| 7,673,714 B2 * | 3/2010 | Soliman et al. | 180/65.265 |

(Continued)

FOREIGN PATENT DOCUMENTS

| | | | |
|---|---|---|---|
| GB | 2446919 A | * | 8/2008 |
| GB | 2446925 A | * | 8/2008 |

(Continued)

*Primary Examiner* — Yonel Beaulieu
*Assistant Examiner* — Courtney Heinle
(74) *Attorney, Agent, or Firm* — David Kelley; Alleman Hall McCoy Russell & Tuttle LLP

(57) ABSTRACT

A method and a system for improving operation of a hybrid vehicle are presented. In one example, operation of a transmission torque converter lockup clutch is adjusted by way of adjusting a transfer function based on torque supplied by an electric machine to improve engine starting control. The approach may improve engine starting and vehicle drivability.

7 Claims, 4 Drawing Sheets

(56) References Cited

U.S. PATENT DOCUMENTS

| | | | |
|---|---|---|---|
| 7,686,112 B2 * | 3/2010 | Shiiba | 180/65.275 |
| 7,975,791 B2 * | 7/2011 | Nozaki et al. | 180/65.6 |
| 8,047,959 B2 * | 11/2011 | Fuechtner et al. | 477/5 |
| 8,169,173 B2 * | 5/2012 | Doerr et al. | 318/432 |
| 8,235,191 B2 * | 8/2012 | Heeke | 192/3.26 |
| 8,298,117 B2 * | 10/2012 | Seel et al. | 477/5 |
| 8,534,399 B2 * | 9/2013 | Soliman et al. | 180/65.21 |
| 2001/0013701 A1 * | 8/2001 | Onoyama et al. | 290/40 C |
| 2003/0004032 A1 * | 1/2003 | Tamor | 477/5 |
| 2003/0153428 A1 * | 8/2003 | Kitano et al. | 477/5 |
| 2003/0173125 A1 * | 9/2003 | Ishikawa | 180/65.2 |
| 2004/0005954 A1 * | 1/2004 | Asa et al. | 477/7 |
| 2004/0029677 A1 * | 2/2004 | Mori et al. | 477/3 |
| 2004/0038774 A1 * | 2/2004 | Kuroda et al. | 477/3 |
| 2004/0050639 A1 * | 3/2004 | Back et al. | 192/3.28 |
| 2004/0149502 A1 * | 8/2004 | Itoh et al. | 180/65.2 |
| 2005/0181909 A1 * | 8/2005 | Oshiumi et al. | 477/156 |
| 2006/0142115 A1 * | 6/2006 | Senda et al. | 477/6 |
| 2007/0246274 A1 * | 10/2007 | Dreibholz et al. | 180/65.2 |
| 2008/0196952 A1 * | 8/2008 | Soliman et al. | 180/65.2 |
| 2008/0196953 A1 * | 8/2008 | Soliman et al. | 180/65.2 |
| 2008/0196954 A1 * | 8/2008 | Soliman et al. | 180/65.2 |
| 2009/0124452 A1 * | 5/2009 | Fuechtner et al. | 477/5 |
| 2009/0124453 A1 * | 5/2009 | Seel et al. | 477/5 |
| 2009/0215586 A1 * | 8/2009 | Kresse | 477/110 |
| 2010/0204883 A1 * | 8/2010 | Honda | 701/36 |
| 2010/0250037 A1 * | 9/2010 | Yoshida et al. | 701/22 |
| 2010/0304923 A1 * | 12/2010 | Schenk et al. | 477/5 |
| 2011/0021310 A1 * | 1/2011 | Kresse et al. | 477/3 |
| 2011/0035085 A1 * | 2/2011 | Falkenstein | 701/22 |
| 2011/0295455 A1 * | 12/2011 | Schenk | 701/22 |
| 2013/0296103 A1 * | 11/2013 | Dai et al. | 477/5 |
| 2013/0296111 A1 * | 11/2013 | Nedorezov et al. | 477/5 |
| 2013/0296125 A1 * | 11/2013 | Gibson et al. | 477/5 |
| 2013/0297122 A1 * | 11/2013 | Gibson et al. | 701/22 |
| 2013/0331228 A1 * | 12/2013 | Miyazaki et al. | 477/5 |
| 2014/0095004 A1 * | 4/2014 | Kresse et al. | 701/22 |
| 2014/0100075 A1 * | 4/2014 | Tabata et al. | 477/3 |

FOREIGN PATENT DOCUMENTS

| | | | | |
|---|---|---|---|---|
| GB | 2446926 A | * | 8/2008 | |
| JP | 2000145946 A | * | 5/2000 | F16H 61/14 |
| JP | 2000145951 A | * | 5/2000 | F16H 61/14 |
| JP | 2003269604 A | * | 9/2003 | F16H 61/14 |
| JP | 3547732 B2 | * | 7/2004 | |
| JP | 2007030530 A | * | 2/2007 | |
| JP | 2009184396 A | * | 8/2009 | |
| JP | 5090947 B2 | * | 12/2012 | |
| JP | 2013193514 A | * | 9/2013 | |
| JP | 2013193519 A | * | 9/2013 | |

* cited by examiner

METHOD AND SYSTEM FOR ADAPTING OPERATION OF A HYBRID VEHICLE TRANSMISSION TORQUE CONVERTER LOCKUP CLUTCH

FIELD

The present description relates to a system and method for adapting operation of a hybrid vehicle transmission torque converter lockup clutch. The method and system may be particularly useful for engines that are selectively coupled to an electrical machine and a transmission.

BACKGROUND AND SUMMARY

A driveline of a hybrid vehicle may include and engine and a motor that are selectively coupled together. The engine and motor may be selectively coupled together via a disconnect clutch. The engine and motor may also be coupled to an automatic transmission that includes a torque converter and lockup clutch. The automatic transmission may also include a torque converter and a plurality of fixed gear ratios.

The transmission torque converter lockup clutch may be selectively applied to improve driveline efficiency. The torque converter may also be applied during engine starting while the transmission is in gear to improve vehicle drivability. For example, the lockup clutch may be applied to shape engine speed and an amount of engine torque that is transferred to vehicle wheels or a vehicle chassis when the transmission is in a tied-up state (e.g., when two or more transmission clutches are engaged to couple the transmission input shaft to the transmission case). In particular, the torque converter clutch may be initially open or in controlled slip where little torque converter clutch pressure is applied. As engine speed increases and reaches a desired speed, the torque converter clutch application pressure or force may be increased to improve driveline efficiency. However, if the torque converter application force or pressure is greater than desired during engine run-up or after the engine reaches a desired speed, vehicle drivability and/or emissions may be degraded.

The inventors herein have recognized the above-mentioned issues and have developed a hybrid powertrain operating method, comprising: rotating at least a portion of an electric machine in a driveline; and adjusting operation of a torque converter lockup clutch in response to a current supplied to the electric machine.

By rotating an electric machine and applying a transmission torque converter lockup clutch, it may be possible to improve lockup clutch operation. In particular, it may be possible to accurately determine an amount of torque transferred across a torque converter lockup clutch so that the lockup clutch may be applied with more precision. In one example, an amount of electric current supplied to the electric machine may be a basis for determining the amount of torque transferred across the lockup clutch. During subsequent lockup clutch application, the lockup clutch closing may be scheduled based on a transfer function that was adjusted in response to an amount of torque transferred across the torque converter lockup clutch.

The present description may provide several advantages. Specifically, the approach may improve engine starting by improving engine speed control during engine starting. Further, the approach may reduce lockup clutch wear. Further still, the approach may improve vehicle drivability.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
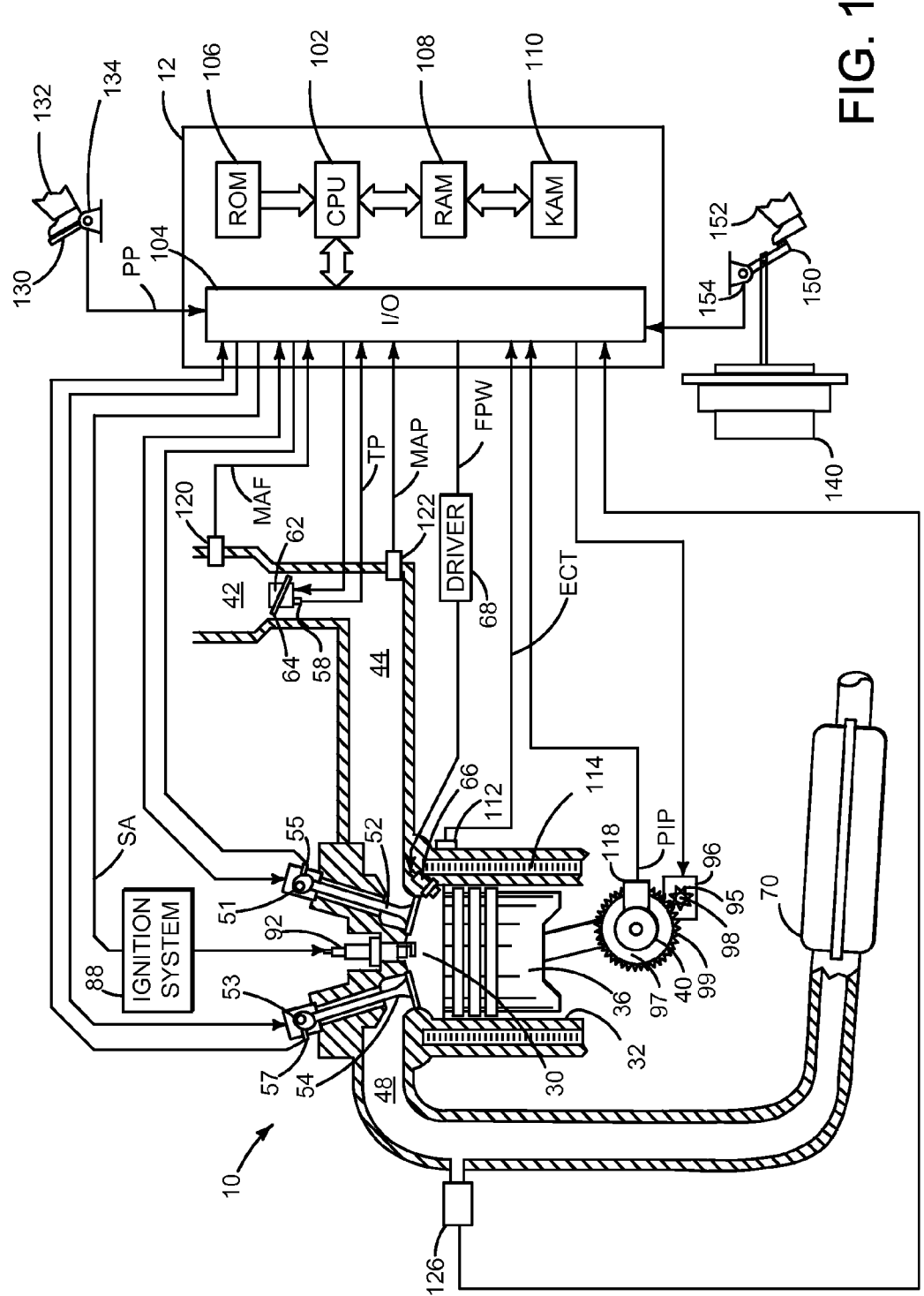
FIG. 1 is a schematic diagram of an engine.
Figure 2:
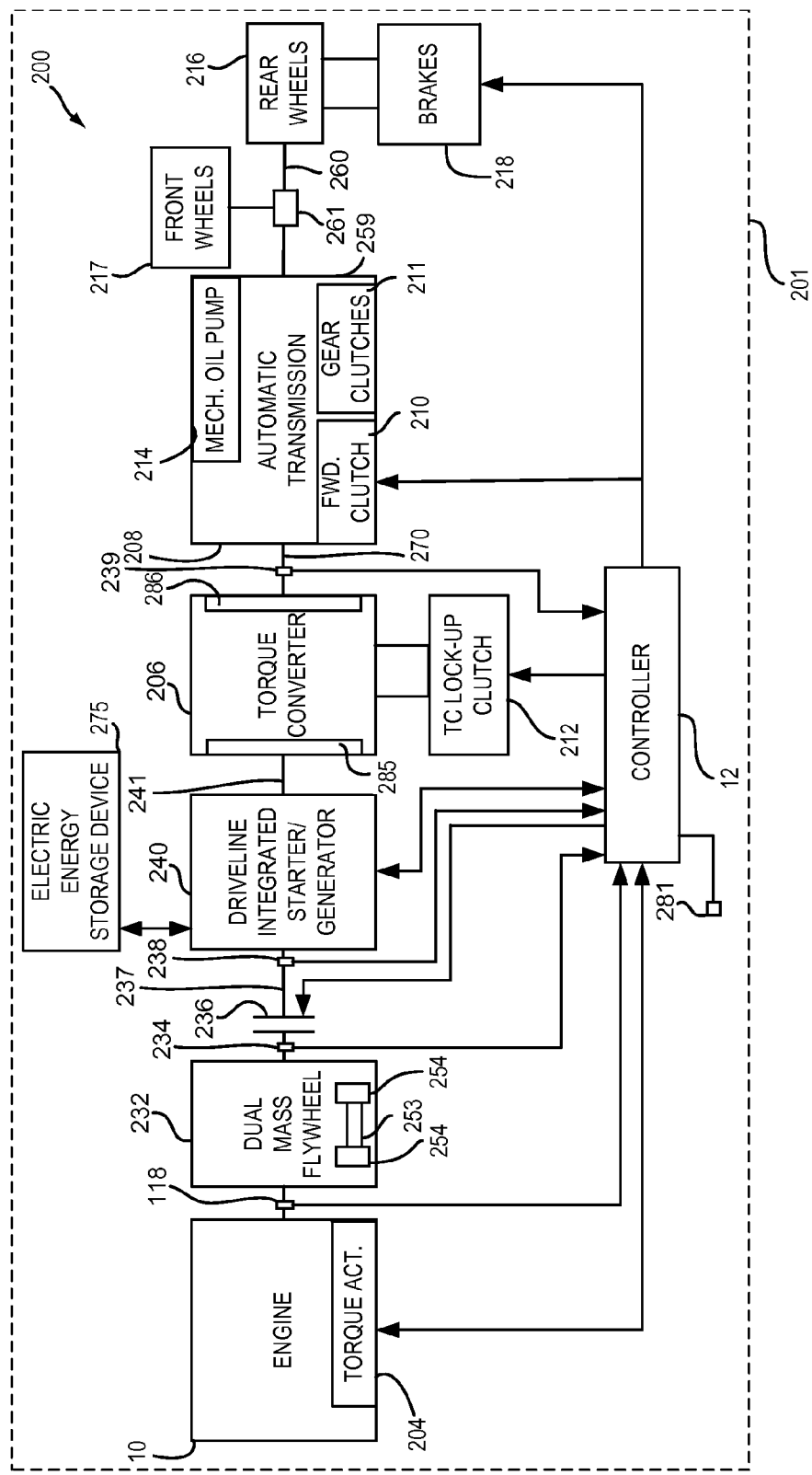
FIG. 2 shows an example vehicle and vehicle driveline configuration.

The present description is related to controlling a hybrid vehicle powertrain. The hybrid vehicle may include an engine and electric machine as shown in FIGS. 1-2. The engine may be operated with or without a driveline integrated starter/generator (DISG) during vehicle operation. The driveline integrated starter/generator is integrated into the driveline on the same axis as the engine crankshaft and rotates whenever the torque converter impeller rotates. Further, the DISG may not be selectively engaged or disengaged from the driveline. Rather, the DISG is an integral part of the driveline. Further still, the DISG may be operated with or without operating the engine. The mass and inertia of the DISG remain with the driveline when the DISG is not operating to provide or absorb torque from the driveline. It should be noted that the DISG may be an AC or DC electrical machine and thus the description of DISG is not meant to limit this disclosure. The hybrid vehicle includes a way to adapt transmission torque converter lockup clutch application to improve engine starting.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from air intake 42 to intake manifold 44. In one example, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Vehicle wheel brakes or regenerative braking via a DISG may be provided when brake pedal 150 is applied via foot 152. Brake pedal sensor 154 supplies a signal indicative of brake pedal position to controller 12. Foot 152 is assisted by brake booster 140 applying vehicle brakes.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. Engine position sensor 118 produces a predetermined number of equally spaced pulses every revolution of the crankshaft from which engine speed (RPM) can be determined.

In some examples, the engine may be coupled to an electric motor/battery system in a hybrid vehicle as shown in FIG. 2. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 201 and vehicle driveline 200. Driveline 200 may be powered by engine 10. Engine 10 may be started with an engine starting system shown in FIG. 1 or via DISG 240. Further, engine 10 may generate or adjust torque via torque actuator 204, such as a fuel injector, throttle, etc.

An engine output torque may be transmitted to an input side of dual mass flywheel (DMF) 232. Engine speed as well as dual mass flywheel input side position and speed may be determined via engine position sensor 118. Dual mass flywheel 232 may include springs 253 and separate masses 254 for dampening driveline torque disturbances. The output side of dual mass flywheel 232 is shown being mechanically coupled to the input side of disconnect clutch 236. Disconnect clutch 236 may be electrically or hydraulically actuated. A position sensor 234 is positioned on the disconnect clutch side of dual mass flywheel 232 to sense the output position and speed of the dual mass flywheel 232. The downstream side of disconnect clutch 236 is shown mechanically coupled to DISG input shaft 237.

DISG 240 may be operated to provide torque to driveline 200 or to convert driveline torque into electrical energy to be stored in electric energy storage device 275. DISG 240 has a higher output power capacity than starter 96 shown in FIG. 1. Further, DISG 240 directly drives driveline 200 or is directly driven by driveline 200. There are no belts, gears, or chains to couple DISG 240 to driveline 200. Rather, DISG 240 rotates at the same rate as driveline 200. Electrical energy storage device 275 may be a battery, capacitor, or inductor. The downstream side of DISG 240 is mechanically coupled to the impeller 285 of torque converter 206 via shaft 241. The upstream side of the DISG 240 is mechanically coupled to the disconnect clutch 236. Torque converter 206 includes a turbine 286 to output torque to transmission input shaft 270. Transmission input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission. Torque converter turbine speed and position may be determined via position sensor 239. In some examples, 238 and/or 239 may be torque sensors or may be combination position and torque sensors.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the transmission torque converter lockup clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-6) 211 and forward clutch 210. The gear clutches 211 and the forward clutch 210 may be selectively engaged to propel a vehicle. Torque output from the automatic transmission 208 may in turn be relayed to rear wheels 216 to propel the vehicle via output shaft 260. Specifically, automatic transmission 208 may transfer an input driving torque at the input shaft 270 responsive to a vehicle traveling condition before transmitting an output driving torque to the rear wheels 216. Torque may also be directed to front wheels 217 via transfer case 261.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

A mechanical oil pump 214 may be in fluid communication with automatic transmission 208 to provide hydraulic pressure to engage various clutches, such as forward clutch 210, gear clutches 211, and/or torque converter lock-up clutch 212. Mechanical oil pump 214 may be operated in accordance with torque converter 206, and may be driven by the rotation of the engine or DISG via input shaft 241, for example. Thus, the hydraulic pressure generated in mechanical oil pump 214 may increase as an engine speed and/or DISG speed increases, and may decrease as an engine speed and/or DISG speed decreases.

Controller 12 may be configured to receive inputs from engine 10, as shown in more detail in FIG. 1, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art. Controller 12 also receives driving surface grade input information from inclinometer 281.

When idle-stop conditions are satisfied, controller 42 may initiate engine shutdown by shutting off fuel and spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. When engine restart conditions are satisfied, and/or a vehicle operator wants to launch the vehicle, controller 12 may reactivate the engine by resuming combustion in engine cylinders.

The system of FIGS. 1 and 2 provides for a system for a hybrid powertrain, comprising: an engine; a driveline integrated electric machine; a disconnect clutch positioned in a driveline between the engine and the electric machine; a transmission; a torque converter including a lockup clutch in mechanical communication with the driveline integrated electric machine and the transmission; and a controller including executable instructions stored in non-transitory memory, the executable instructions providing for adjusting operation of the lockup clutch in response to a current supplied to the driveline integrated electric machine.

In some examples, the system further comprises additional instructions to close the disconnect clutch in response to a request to adapt operation of the lockup clutch. The system further comprises additional instructions for operating the driveline integrated electric machine in a speed control mode during adjusting operation of the lockup clutch. The system further comprises additional instructions to incrementally close the lockup clutch in response to a request to adjust operation of the lockup clutch. The system further comprises additional instructions to adjust a lockup clutch transfer function. The system further comprises additional instructions for converting the current to a torque and applying the lockup clutch during an engine start.

Figure 3:
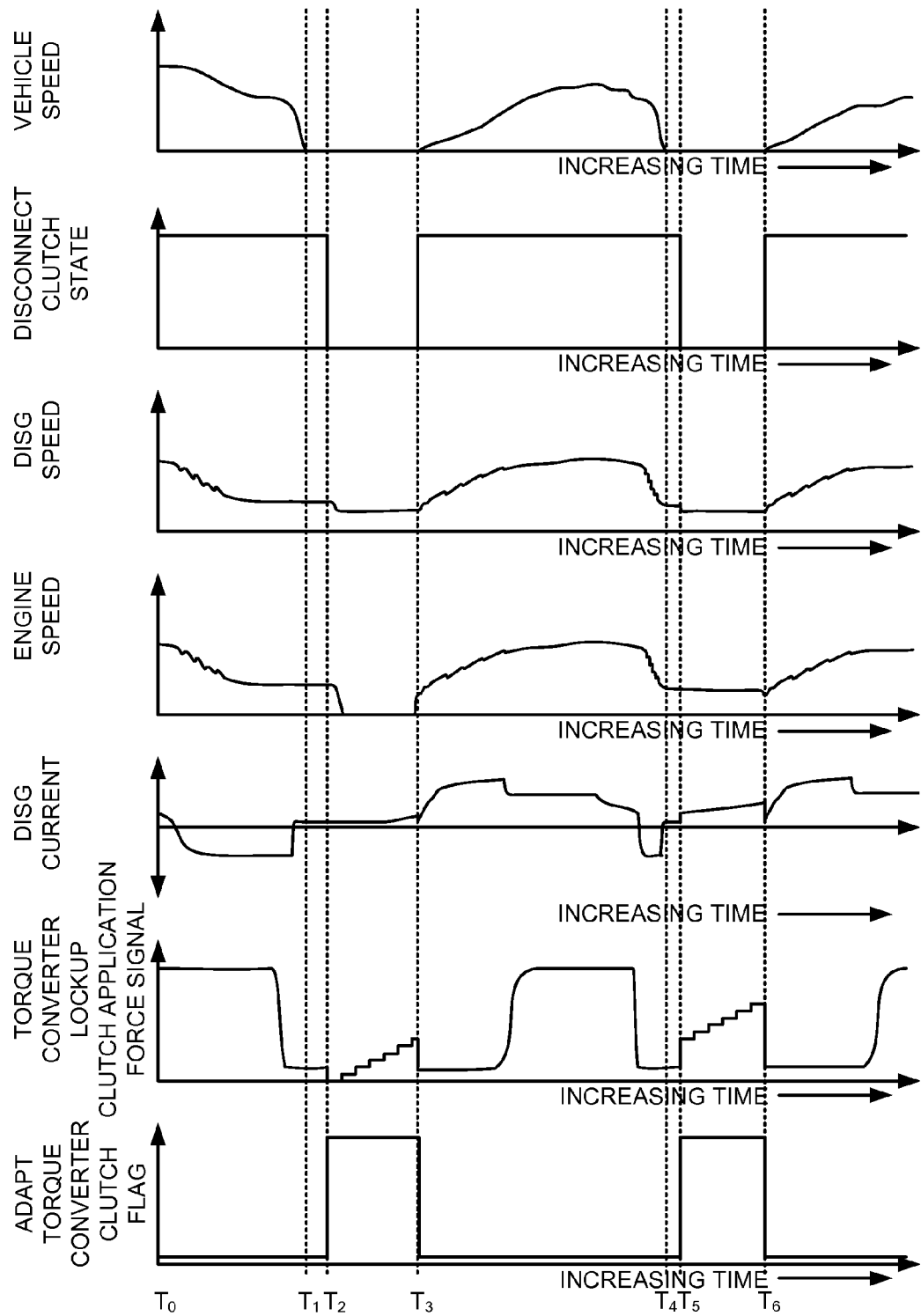
FIG. 3 shows a prophetic hybrid powertrain operating sequence.

Referring now to FIG. 3, an example hybrid vehicle operating sequence is shown. The sequence of FIG. 3 shows a hybrid vehicle method for adapting operation of a transmission torque converter lockup clutch. The example sequence may be performed by the system of FIGS. 1 and 2 according to the method of FIG. 4. Vertical markers $T_0$-$T_6$ represent times of particular interest in the sequence.

The first plot from the top of the figure shows vehicle speed versus time. The Y axis represents vehicle speed and vehicle speed increases in the direction of the Y axis arrow. The X axis represents time and time increases from the left to the right side of the plot.

The second plot from the top of the figure shows driveline disconnect clutch state versus time. The Y axis represents driveline disconnect clutch state where a higher level represents a closed driveline disconnect clutch and a lower level indicates an open driveline disconnect clutch. The X axis represents time and time increases from the left to the right side of the plot.

The third plot from the top of the figure shows DISG speed versus time. The Y axis represents DISG speed and DISG speed increases in the direction of the Y axis arrow. The X axis represents time and time increases from the left to the right side of the plot.

The fourth plot from the top of the figure shows engine speed versus time. The Y axis represents engine speed and engine speed increases in the direction of the Y axis arrow. The X axis represents time and time increases from the left to the right side of the plot.

The fifth plot from the top of the figure shows DISG current versus time. The Y axis represents DISG current and DISG current increases in the direction of the Y axis arrow. The X axis represents time and time increases from the left to the right side of the plot. The DISG is supplying torque to the driveline when DISG current is above the X axis. The DISG is generating electrical power to store in the electric energy storage device when the DISG current is below the X axis.

The sixth plot from the top of the figure shows a transmission torque converter lockup clutch application force signal versus time. The Y axis represents transmission torque converter lockup clutch application force and transmission torque converter lockup clutch application force increases in the direction of the Y axis arrow. The X axis represents time and time increases from the left to the right side of the plot. The greater the torque converter application force, the more torque that may be transferred by the transmission torque converter lockup clutch.

The seventh plot from the top of the figure shows a transmission torque converter lockup clutch adaptation flag versus time. The Y axis represents transmission torque converter lockup clutch adaption flag state and transmission torque converter lockup clutch adaption flag state is at a higher level when transmission torque converter lockup clutch transfer function parameters are being learned. The transmission torque converter lockup clutch adaption flag state at a lower level when transmission torque converter lockup clutch transfer function parameters are not being learned. The X axis represents time and time increases from the left to the right side of the plot.

At time $T_0$, the vehicle speed is at a medium level, the driveline disconnect clutch is closed, engine and DISG speed are at medium levels, DISG current is positive indicating that the DISG is supplying torque to the driveline, the transmission torque converter lockup clutch is closed, and the transmission torque converter lockup clutch adapt flag is low indicating that the transmission torque converter lockup clutch transfer function is not being adapted or adjusted.

Between time $T_0$ and time $T_1$, vehicle speed is reduced in response to a driver reducing a driver demand torque and applying vehicle brakes (not shown). The driveline disconnect clutch remains closed and the DISG and engine speeds are reduced as vehicle speed is reduced. The DISG current switches to a negative value indicating that the DISG is charging the energy storage device in response to the vehicle braking request. The torque converter lockup clutch remains locked for a portion of the vehicle deceleration period. The transmission torque converter lockup clutch adaption flag remains low indicating that the transmission torque converter lockup clutch transfer function is not being adapted.

At time $T_1$, the vehicle speed reaches zero. The DISG speed and the engine speed reach a lower level, a predetermined idle speed for example. The DISG current also switches back to a positive side shortly before time $T_1$ so that the driveline continues to rotate. The transmission torque converter lockup clutch opens to a level where a high level of slip occurs without being completely open, and the transmission torque converter lockup clutch adaption flag remains in a low state indicating transmission torque converter lockup clutch transfer function adaptation is not occurring.

At time $T_2$, select conditions for transmission torque converter lockup clutch transfer function adaptation are present, and the transmission torque converter lockup clutch adaptation flag transitions to a higher level to indicate transmission torque converter lockup clutch transfer function adaptation is beginning. The driveline disconnect clutch is opened in response to the transmission torque converter lockup clutch adaption flag transitioning to a higher level. The engine is also stopped at this particular time since driver demand torque is low so that fuel may be conserved. The DISG speed is reduced to a level where less than a predetermined amount of DISG torque may be transferred to vehicle wheels. In one example, the predetermined amount of torque is less than an amount of torque that will cause vehicle wheels to rotate. Thus, the DISG speed is based on torque converter output characteristics. The DISG is operated in a speed control mode where DISG current is adjusted to a level that keeps the DISG at the predetermined speed. Further, the transmission torque converter lockup clutch application force signal is decreased to fully open the transmission torque converter lockup clutch and reduce transmission torque converter lockup clutch slip.

Between time $T_2$ and time $T_3$, the vehicle speed remains at zero and the transmission torque converter lockup clutch adaptation flag remains asserted to indicate that the transmission torque converter lockup clutch transfer function is being adapted. The transmission torque converter lockup clutch application force signal begins at a low level (e.g., a demand of zero) and it is incrementally increased. At each transmission torque converter lockup clutch application force signal level, DISG current and the transmission torque converter lockup clutch application force signal are monitored and stored to memory. The DISG current when the transmission torque converter lockup clutch is at a low level (e.g., zero) is subtracted from all DISG current values recorded. The remaining DISG current values are converted to torque via a DISG current to torque transfer function. The transmission torque converter lockup clutch transfer function is updated with the DISG torque values determined at each transmission torque converter lockup clutch application force signal level.

At time $T_3$, the transmission torque converter lockup clutch adaptation flag transitions to a lower level in response to an increase in the driver demand torque. The engine is also restarted and the disconnect clutch is closed as indicated by the disconnect clutch state transitioning to a high level. The transmission torque converter lockup clutch application force signal is reduced so that the torque converter may multiply the engine and DISG torque during vehicle acceleration. The engine and DISG speed increase to provide the desired driver demand torque.

Between time $T_3$ and time $T_4$, the vehicle accelerates and then levels off before returning to zero. The driveline disconnect clutch remains closed coupling the engine and the motor, and DISG and engine speed vary with vehicle speed. The DISG current remains positive until shortly before time $T_4$ where the DISG current goes negative to indicate that the DISG is charging the energy storage device using the vehicle's kinetic energy. The transmission torque converter lockup clutch force signal initially allows the torque converter to multiply DISG and engine torque and then locks to improve driveline efficiency. The transmission torque converter lockup clutch adaption flag remains at a lower level to indicate that the transmission torque converter lockup clutch transfer function is not being adapted.

At time $T_4$, the vehicle speed reaches zero. The DISG speed and the engine speed reach a lower level. The DISG current also switches back to a positive side shortly before time $T_4$ so that the driveline continues to rotate. The transmission torque converter lockup clutch opens to a level where a high level of slip occurs without being completely open, and the transmission torque converter lockup clutch adaption flag remains in a low state indicating transmission torque converter lockup clutch transfer function adaptation is not occurring.

At time $T_5$, select conditions for transmission torque converter lockup clutch transfer function adaptation are present, and the transmission torque converter lockup clutch adaptation flag transitions to a higher level to indicate transmission torque converter lockup clutch transfer function adaptation is beginning. The driveline disconnect clutch is opened in response to the transmission torque converter lockup clutch adaption flag transitioning to a higher level. The engine remains operating at this time. The engine may remain operating to improve torque response to a driver demand torque, heat exhaust system components such as a catalyst, or for other reasons. The DISG speed is reduced to a level where less than a predetermined amount of DISG torque may be transferred to vehicle wheels. The DISG is operated in a speed control mode where DISG current is adjusted to a level that keeps the DISG at the predetermined speed. Additionally, the transmission torque converter lockup clutch application force signal is decreased to fully open the transmission torque converter lockup clutch and reduce transmission torque converter lockup clutch slip.

Between time $T_5$ and time $T_6$, the vehicle speed remains at zero and the transmission torque converter lockup clutch adaptation flag remains asserted to indicate that the transmission torque converter lockup clutch transfer function is being adapted. The transmission torque converter lockup clutch application force signal begins at a level where the previous transmission torque converter lockup clutch adaption terminated and it is incrementally increased. Again, at each transmission torque converter lockup clutch application force signal level, DISG current and the transmission torque converter lockup clutch application force signal are monitored and stored to memory. The DISG current determined when the transmission torque converter lockup clutch was at a low level (e.g., zero) is subtracted from all DISG current values recorded. The remaining DISG current values are converted to torque values via a DISG current to torque transfer function. The transmission torque converter lockup clutch transfer function is updated with the DISG torque values determined at each transmission torque converter lockup clutch application force signal level.

At time $T_6$, the transmission torque converter lockup clutch adaptation flag transitions to a lower level in response to the transmission torque converter lockup clutch application force signal reaching a desired predetermined level. The engine and DISG speeds are matched and then the disconnect clutch is closed as indicated by the disconnect clutch state transitioning to a high level. The transmission torque converter lockup clutch application force signal is reduced so that the torque converter may multiply the engine and DISG torque during the following vehicle acceleration. The engine and DISG speed increase to provide the desired driver demand torque.

In this way, a DISG current may be a basis for determining torque transferred by a transmission torque converter lockup clutch for a given transmission torque converter lockup clutch force signal. Further, even though transmission torque converter lockup clutch adaptation may be interrupted, it may be reinitiated without having to start from an initial transmission torque converter lockup clutch signal.

Figure 4:
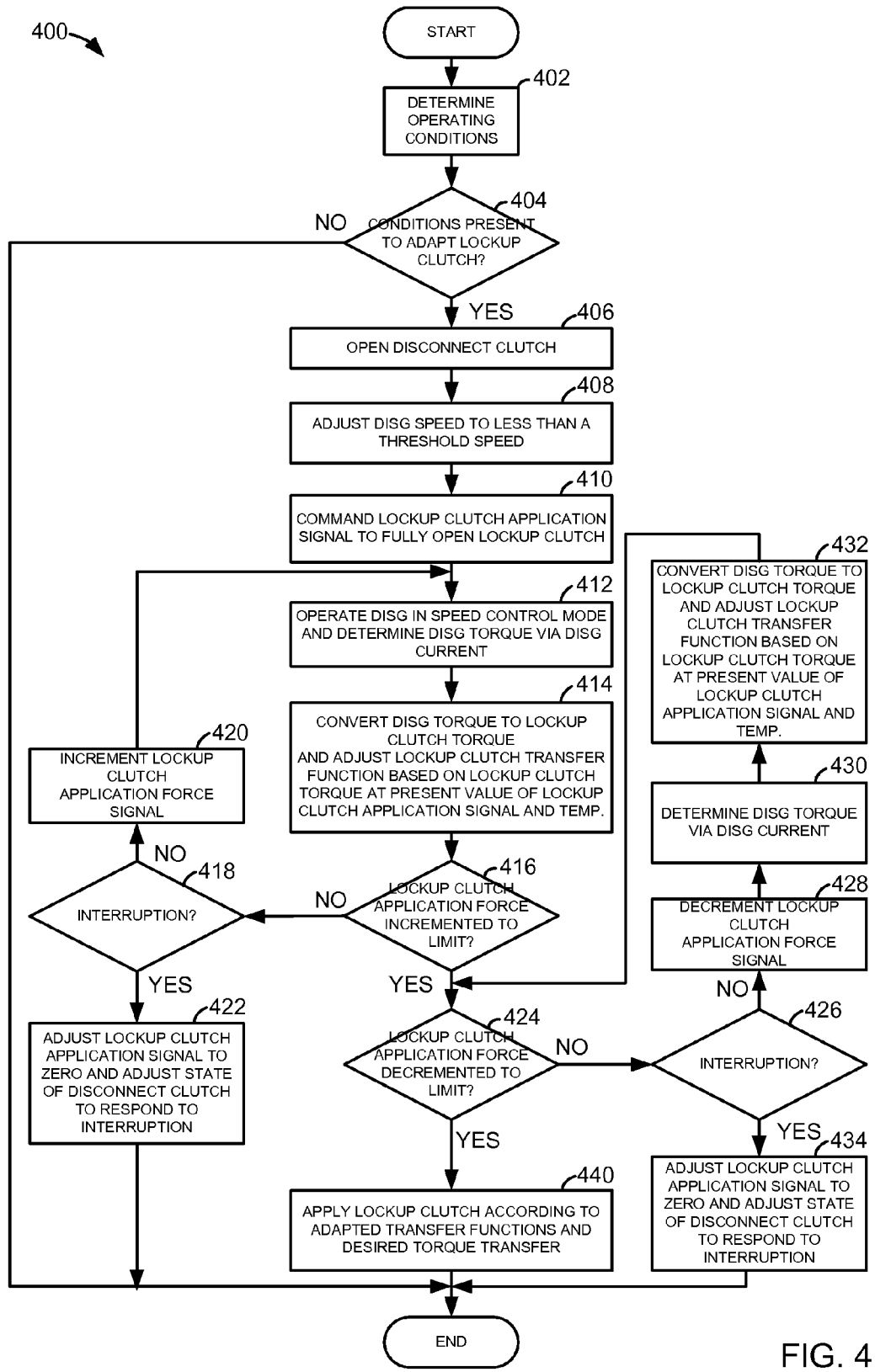
FIG. 4 shows a method for adapting a hybrid vehicle transmission torque converter lockup clutch.

Referring now to FIG. 4 an example method for adapting a hybrid vehicle transmission torque converter lockup clutch is shown. The method of FIG. 4 may be stored as executable instructions in non-transitory memory in the system of FIGS. 1 and 2. Further, the method of FIG. 4 may provide the sequence shown in FIG. 3.

At 402, method 400 determines operating conditions. Operating conditions may include but are not limited to vehicle speed, engine speed, disconnect clutch state, DISG speed, and transmission torque converter lockup clutch state. Method 400 proceeds to 404 after operating conditions are determined.

At 404, method 400 judges whether or not conditions are present to adapt the transmission torque converter lockup clutch transfer function. In one example, the transmission torque converter lockup clutch transfer function may be adapted when vehicle speed is zero, vehicle brakes are applied or when the transmission is tied-up, and when driver demand torque is less than a threshold level of torque. Further, in some examples, transmission temperature is required to be greater than a predetermined temperature and energy storage device state of charge (SOC) is required to be greater than a threshold SOC. If method 400 judges that conditions are present to adapt the transmission torque converter lockup clutch transfer function, the answer is yes and method 400 proceeds to 406. Otherwise, the answer is no and method 400 proceeds to exit.

At 406, method 400 opens the driveline disconnect clutch if it is not already open. The driveline disconnect clutch may be opened via an electric or hydraulic actuator. Method 400 proceeds to 408 after the driveline disconnect clutch is opened.

At 408, method 400 adjusts DISG speed to a desired speed. In one example, the desired speed is a speed where less than a predetermined fraction of DISG torque is transferred to vehicle wheels. In another example, the DISG is adjusted to a speed based on a torque converter output transfer function. For example, the DISG speed may be adjusted to a speed where less than a predetermined fraction (e.g., 10%) of DISG torque is directed to the transmission input shaft. In still another example, the DISG speed may be adjusted between a desired speed that provides a desired oil pressure from a transmission oil pump and a speed where less than a predetermined fraction of DISG torque is directed to the transmission input shaft (e.g., 600 RPM). Method 400 proceeds to 410 after the DISG speed is adjusted.

At 410, method 400 commands the transmission torque converter lockup clutch to a fully open position. The transmission torque converter lockup clutch is commanded to a full open position so that little if any torque is transferred across the lockup clutch. Further, engine rotation may be stopped to conserve fuel. Alternatively, the engine may be operated at idle speed in anticipation of an increase in driver demand torque. Method 400 proceeds to 412 after the transmission torque converter lockup clutch is commanded to a full open position.

At 412, method 400 operates the DISG in a speed control mode and determines DISG output torque in response to DISG current. The DISG current is adjusted to hold DISG speed at a substantially constant value (e.g., ±100 RPM) so that when a load applied to the DISG changes, the DISG current also changes and the DISG is held at a constant speed. DISG current is also converted to a DISG output torque via a transfer function that relates DISG current to DISG output torque. Further, method 400 designates the DISG output torque as that for a closing lockup clutch. Method 400 proceeds to 414 after DISG is operating in speed control mode and after DISG output torque is begins to be recorded.

At 414, method 400 converts DISG output torque to transmission torque converter lockup clutch torque. The DISG output torque may be converted to transmission torque converter lockup clutch torque by subtracting DISG output torque from when the transmission torque converter lockup clutch is fully open from the DISG output torque at the present conditions. Additionally, a transmission torque converter lockup clutch torque value at the present value of the transmission torque converter lockup clutch application force signal replaces a corresponding transmission torque converter lockup clutch torque value in the transmission torque converter lockup clutch transfer function. In one example, the transmission torque converter lockup clutch transfer function is indexed based on the transmission torque converter lockup clutch application force signal value and it outputs a transmission torque converter lockup clutch torque. Further, in some examples, the transmission torque converter lockup clutch transfer function also is indexed based on a transmission temperature. Thus, two variables index the transmission torque converter lockup clutch transfer function and a single transmission torque converter lockup clutch torque is output. Method 400 proceeds to 416 after the transmission torque converter closing transfer function is revised and after the DISG output torque is converted to a transmission torque converter lockup clutch torque.

At 416, method 400 judges whether or not the transmission torque converter lockup clutch application force signal has been incremented to a threshold value. The threshold value may be a transmission torque converter lockup clutch force that fully locks the torque converter lockup clutch or some fraction of that value. If method 400 judges that the transmission torque converter lockup clutch application force signal has been incremented to the threshold limit, the answer is yes and method 400 proceeds to 424. Otherwise, the answer is no and method 400 proceeds to 418.

At 418, method 400 judges whether or not there is an interruption in the transmission torque converter lockup clutch transfer function adaptation method. An interruption may occur if a driver demand torque is increased, vehicle motion is detected, energy storage device SOC falls to less than a threshold level, or other selected condition occurs after the transmission torque converter lockup clutch transfer function adaptation method begins. Further, if there is an interruption, method 400 stores the present value of the transmission torque converter lockup clutch application force command or signal so that method 400 may begin a subsequent execution starting with the same number. If method 400 judges that an interruption has occurred, the answer is yes and method 400 proceeds to 422. Otherwise, the answer is no and method 400 proceeds to 420.

At 422, method 400 adjusts the transmission torque converter application force signal or command to zero or another suitable value to open the transmission torque converter lockup clutch. Further, the driveline disconnect clutch state may be adjusted. In one example, the driveline disconnect clutch may be closed to increase the amount of available driveline torque. In other examples, the driveline disconnect clutch may be held open if the DISG is capable of providing the desired driver demand torque. Method 400 proceeds to exit after the transmission torque converter application force command and driveline disconnect clutch are adjusted.

At 420, method 400 increments the transmission torque converter lockup clutch application force signal or command. In one example, the increment is a predetermined amount, five percent of the full scale command for example. Method 400 returns to 412 after the transmission torque converter lockup clutch application force command or signal is incremented.

At 424, method 400 judges whether or not the transmission torque converter lockup clutch application force command or signal has been decremented to a predetermined limit, a value where the transmission torque converter lockup clutch is fully open for example. If method 400 judges that the transmission torque converter lockup clutch application force command or signal has been decremented to the predetermined limit, the answer is yes and method 400 proceeds to 440. Otherwise, the answer is no and method 400 proceeds to 426.

At 426, method 400 judges whether or not there is an interruption in the transmission torque converter lockup clutch transfer function adaptation method. An interruption may occur as is described at 418. Further, if there is an interruption, method 400 stores the present value of the transmission torque converter lockup clutch application force command or signal so that method 400 may begin a subsequent execution starting with the same number. If method 400 judges that an interruption has occurred, the answer is yes and method 400 proceeds to 434. Otherwise, the answer is no and method 400 proceeds to 428.

At 434, method 400 adjusts the transmission torque converter application force signal or command to zero or another suitable value to open the transmission torque converter lockup clutch. Further, the driveline disconnect clutch state may be adjusted. In one example, the driveline disconnect clutch may be closed to increase the amount of available driveline torque. In other examples, the driveline disconnect clutch may be held open if the DISG is capable of providing the desired driver demand torque. Method 400 proceeds to exit after the transmission torque converter application force command and driveline disconnect clutch are adjusted.

At 428, method 400 decrements the transmission torque converter lockup clutch application force signal or command. In one example, the decrement value is a predetermined amount, five percent of the full scale command value for example. Method 400 proceeds to 430 after the transmission torque converter lockup clutch application force command or signal is decremented.

At 430, method 400 continues to operate the DISG in a speed control mode and determines DISG output torque in response to DISG current. DISG current is converted to a DISG output torque via a transfer function that relates DISG current to DISG output torque. Further, method 400 designates the DISG output torque as that for an opening lockup clutch. Method 400 proceeds to 432 after DISG is operating in speed control mode and after DISG output torque is begins to be recorded.

At 432, method 400 converts DISG output torque to transmission torque converter lockup clutch torque. The DISG output torque may be converted to transmission torque converter lockup clutch torque by subtracting DISG output torque from when the transmission torque converter lockup clutch is fully open from the DISG output torque at the present conditions. Further, a transmission torque converter lockup clutch torque value at the present value of the transmission torque converter lockup clutch application force signal replaces a corresponding transmission torque converter lockup clutch torque value in the transmission torque converter lockup clutch transfer function. In one example, the transmission torque converter lockup clutch transfer function is indexed based on the transmission torque converter lockup clutch application force signal value and it outputs a transmission torque converter lockup clutch torque. Further, in some examples, the transmission torque converter lockup clutch transfer function also is indexed based on a transmission temperature. In this way, two variables index the transmission torque converter lockup clutch transfer function and a single transmission torque converter lockup clutch torque is output. Method 400 returns to 424 after the transmission torque converter opening transfer function is revised and after the DISG output torque is converted to a transmission torque converter lockup clutch torque.

At 440, method 400 applies the adapted transmission torque converter lockup application force command or signal transfer function to operating the lockup clutch. The transmission torque converter lockup clutch may be applied during engine starting or during normal driveline operation. Additionally, the DISG may transition to a torque control mode in response to a driver demand torque. Method 400 proceeds to exit after applying the adapted transmission torque converter lockup application force command or signal transfer function.

Thus, the method of FIG. 4 provides for a hybrid powertrain operating method, comprising: rotating at least a portion of an electric machine in a driveline; and adjusting operation of a torque converter lockup clutch in response to a current supplied to the electric machine. The method includes where the electric machine is a driveline integrated starter/generator (DISG). The method further comprises incrementally engaging the torque converter lockup clutch. In one example, the method includes where the electric machine is rotated at a constant speed.

The method further comprises converting the current into an amount of torque transferred across the torque converter lockup clutch. In this way, an amount of torque transferred across the lockup clutch may be determined. The method further comprises stopping forward motion of a vehicle that includes the driveline while rotating the electric machine. The method also includes where rotating at least a portion of the electric machine includes rotating the electric machine at a speed where less than a threshold percentage of torque produced by the electric machine is passed through a torque converter and into a transmission.

In another example, the method of FIG. 4 provides for a hybrid powertrain operating method, comprising: opening a driveline disconnect clutch positioned in a driveline between an electric machine and an engine in response to a request to adjust operation of a torque converter lockup clutch; rotating at least a portion of the electric machine in the driveline; and at least partially closing the torque converter lockup clutch in response to the request to adjust operation of a torque converter lockup clutch. The method further comprises adjusting operation of the torque converter lockup clutch in response to a current supplied to the electric machine. The method includes where torque converter lockup clutch operation is adjusted after the torque converter has been at least partially opened.

In another example, the method comprises adjusting a torque converter lockup clutch transfer function in response to the request to adjust operation of the torque converter lockup clutch. The method further comprises at least partially opening the torque converter lockup clutch from at least a partially closed position in response to the request to adjust operation of the torque converter lockup clutch, and adjusting operation of the torque converter lockup clutch in response to the current supplied to the electric machine. The method includes where the electric machine is operated at a constant speed. The method also includes where electric machine is operated in a speed control mode.

As will be appreciated by one of ordinary skill in the art, methods described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A hybrid powertrain operating method, comprising:
   opening a driveline disconnect clutch positioned in a driveline between an electric machine and an engine in response to a request to adjust a transfer function of a torque converter lockup clutch;
   rotating at least a portion of the electric machine in the driveline;
   applying the torque converter lockup clutch in a plurality of step increases of application force commands in response to the request to adjust the transfer function of the torque converter lockup clutch; and
   adjusting the transfer function of the torque converter lockup clutch based on an amount of current supplied to the electric machine to maintain electric machine speed at a constant speed while applying the torque converter lockup clutch in the plurality of step increases in application force commands.

2. The method of claim 1, where the transfer function of the torque converter lockup clutch is adjusted based on output of a transfer function relating an amount of current supplied to the electric machine to a torque, and further comprising interrupting adjusting the transfer function of the torque converter lockup clutch in response to a driver demand torque increase.

3. The method of claim 2, where the transfer function of the torque converter lockup clutch is adjusted after the torque converter lockup clutch has been opened, and further comprising interrupting adjusting the transfer function of the torque converter lockup clutch in response to detecting vehicle motion.

4. The method of claim 1, further comprising adjusting the transfer function of the torque converter lockup clutch in response to the amount of current supplied to the electric machine during the applying of the torque converter lockup clutch.

5. The method of claim 1, further comprising opening the torque converter lockup clutch from a closed position in response to the request to adjust the transfer function of the torque converter lockup clutch.

6. The method of claim 1, further comprising interrupting adjusting the transfer function in response to an energy storage device state of charge less than a threshold, and where adjusting the transfer function of the torque converter lockup clutch includes replacing a torque converter lockup clutch torque value in the transfer function of the torque converter lockup clutch with a torque value based on an amount of current supplied to the electric machine.

7. The method of claim 6, where the electric machine is operated in a speed control mode, and further comprising adjusting the transfer function from a torque converter lockup clutch application force level at which adjusting the transfer function was interrupted.

* * * * *